United States Patent [19]
Baradel et al.

[11] Patent Number: 5,488,723
[45] Date of Patent: Jan. 30, 1996

[54] SOFTWARE SYSTEM HAVING REPLICATED OBJECTS AND USING DYNAMIC MESSAGING, IN PARTICULAR FOR A MONITORING/CONTROL INSTALLATION OF REDUNDANT ARCHITECTURE

[75] Inventors: Christophe Baradel, Paris; Yves Eychenne, Limours; Bruno Kohen, Paris, all of France

[73] Assignee: Cegelec, Levallois-Perret, France

[21] Appl. No.: 185,859

[22] PCT Filed: May 24, 1993

[86] PCT No.: PCT/FR93/00499

§ 371 Date: Jan. 24, 1994

§ 102(e) Date: Jan. 24, 1994

[87] PCT Pub. No.: WO93/24884

PCT Pub. Date: Dec. 9, 1993

[30] Foreign Application Priority Data

May 25, 1992 [FR] France .................. 92 06372

[51] Int. Cl.$^6$ .................................. G06F 15/16
[52] U.S. Cl. .................. 395/700; 395/600; 395/650; 364/284.3; 364/284.4; 364/285; 364/281.3
[58] Field of Search ............. 364/DIG. 1, DIG. 2; 395/575

[56] References Cited

U.S. PATENT DOCUMENTS

| | | | |
|---|---|---|---|
| 4,356,546 | 10/1982 | Whiteside et al. | 364/200 |
| 4,590,554 | 5/1986 | Glazer et al. | 364/200 |
| 4,633,387 | 12/1986 | Hartung et al. | 395/650 |
| 4,714,995 | 12/1987 | Materna et al. | 364/200 |
| 4,797,884 | 1/1989 | Yalowitz et al. | 371/9 |
| 4,853,843 | 8/1989 | Ecklund | 364/400 |
| 4,958,270 | 9/1990 | McLuaghlin et al. | 364/187 |
| 5,088,021 | 2/1992 | McLaughlin et al. | 364/187 |
| 5,230,051 | 7/1993 | Quan | 395/700 |

FOREIGN PATENT DOCUMENTS

| | | |
|---|---|---|
| 0228559A1 | 7/1987 | European Pat. Off. . |
| 2561410 | 9/1985 | France . |

OTHER PUBLICATIONS

Jalote, Resilient Objects in Broadcast Networks, IEEE Trans. on Software Engr. vol. 15, No. 1, Jan. 1989 pp. 68–72.

Sheu et al, Decomposition of Object Oriented Programs for Fault Tolerant Computing in Distributed Environment, pp. 304–310, Future Trends of Distrib. Computing Systems Workshop, 1992.

(List continued on next page.)

*Primary Examiner*—Kevin A. Kriess
*Assistant Examiner*—Lucien Toplu
*Attorney, Agent, or Firm*—Sughrue, Mion, Zinn, Macpeak & Seas

[57] ABSTRACT

The invention relates to an object-oriented software system having replicated objects and which makes it possible to control a monitoring/control installation of redundant architecture and comprising at least one first processor (1) and one second processor (1'). The software system (2) comprises software objects (3) intercommunicating by means of messages via a dynamic object messaging mechanism. A replica (2') of the software system (2) is contained in the second processor (1'). Certain objects (3) of the software system (2) are marked and the dynamic object messaging mechanism (5) includes monitoring means (51) for identifying an object message addressed to a marked object, and means (52) for passing on the contents of the object message, in the form of a network message, to the second processor (1'). In response to the network message, the dynamic object messaging mechanism (5') in the second processor (1') activates the replica (3') of the marked object (3). The invention enables a semi-active redundancy technique to be implemented.

4 Claims, 2 Drawing Sheets

OTHER PUBLICATIONS

Navaratnam et al, Reliable Group Communication in Distributed Systems, Distributed Comp. Syst. 1988 Int. Conf, pp. 439–446.

Takizawa et al, Totally Ordering Broadcast (TO) Protocol on the Ethernet, IEEE Pacific Rim Conf on Comm., Comp. & Signal Processing, Jun. 1989 pp. 16–21.

Takizawa et al, Partially Ordering Broadcast (PO) Protocol, Infocom '90 pp. 357–364.

Sweazey, Shared Memory Systems on the Futurebus, Compcon Spring '88 IEEE Comp. Society Int. Conf. 1988 pp. 505–511.

SOFTWARE SYSTEM HAVING REPLICATED OBJECTS AND USING DYNAMIC MESSAGING, IN PARTICULAR FOR A MONITORING/CONTROL INSTALLATION OF REDUNDANT ARCHITECTURE

BACKGROUND OF THE INVENTION

The invention relates to a software system for a monitoring/control installation of redundant architecture and comprising a first processor (1) connected to a second processor (2) via a communications network (10), the software system comprising a first object-oriented program constituted by first objects to be run by the first processor, a second object-oriented program constituted by second objects that are replicas of at least certain first objects and that are to be run by the second processor, the second objects and said certain first objects encapsulating data, updating means being provided for maintaining consistency between the data of the second objects and the data of said certain first objects during running of said certain first objects.

An object-oriented program is particularly suited to the diversity of supervisory functions in a monitoring/control installation, because of the modular structure of the program. There are numerous existing object-oriented programming languages on the market that enable programs to be made that can include several thousand software objects. Conventionally, a software object encapsulates data and methods that operate on the data of the object.

It is advisable, and often even a requirement, for an industrial monitoring/control installation to tolerate failures so as to guarantee continuity of service.

Redundancy techniques are a well known solution to failure tolerance.

U.S. Pat. No. 4 958 270 describes a data-processing system of redundant architecture comprising two processors running programs which are not necessarily object-oriented programs. The program run by the first processor handles data recorded in a first data base, and the program run by the second processor handles data recorded in a second data base. An updating system is also provided for maintaining consistency between the first data base and the second data base. The updating system is constituted by a program run by the second processor so as to:

perform certain control operations that are performed by the first processor;

update the first data base in response to performing said certain operations;

capture predetermined information to be recorded in the first data base simultaneously with updating thereof; and transfer the captured data to the second processor so as to update the second data base.

In the redundancy technique described in that document, the second processor is used only to pass on the changes made in the first data base to the second data base. Since the second processor is relieved of some of the processing performed by the first processor, the second processor can be used for other tasks. That redundancy technique may be referred to as "semi-active redundancy".

SUMMARY OF THE INVENTION

An aim of the invention is to provide a monitoring/control installation comprising at least two processors running object-oriented programs in parallel using a semi-active redundancy technique.

Object-oriented programs make it possible to concentrate all of the data that is to be retained (i.e. non-volatile data), e.g. relating to alarms, trends, archives, orders given by operators, etc. in only a small number of the program objects. Therefore, the changes made on the non-volatile data of the few objects of the first program that are run by the first processor are passed on to the few replica objects of the second program that are run by the second processor, without all the objects of the second program being implemented. In particular, when the monitoring/control installation is operating normally, it is desirable for only those objects of the second program which encapsulate non-volatile data to be run in parallel with those objects of the first program which encapsulate such non-volatile data, so as to reduce the processing load on the second processor, while guaranteeing service continuity should a failure occur in the first processor. Replication granularity must therefore be an object.

Furthermore, it is desirable to achieve this aim without calling into question the existing structure of the objects of the first program.

To this end, the invention provides an object-oriented software system characterized in that the updating means comprise a first dynamic object messaging mechanism used by the first objects, and a second dynamic object messaging mechanism used by the second objects, and in that, in the first messaging mechanism, in addition to addressing means for dynamically chaining the running of a calling first object with the running of a called other first object referenced in an object call message by said calling first object, monitoring means are provided organized for performing the following operations on the basis of each object call message:

a) comparing marking information derived from the first object referenced in the object call message with reference information to detect whether or not the referenced first object is a replicated object; and b) in response to a marked object being detected, transferring the object call message to the second dynamic messaging mechanism via the communications network so that the second object that is the replica of the first object referenced in the transferred object call message can be run by the second processor and via the second messaging mechanism.

In accordance with the invention, the objects encapsulating non-volatile data are marked, and the first object messaging mechanism is organized to discriminate messages addressed to such marked objects. These messages are transformed into network messages which are transmitted to the second processor to activate the replicas of the objects encapsulating non-volatile data. The other object replicas present in the second processor are not normally run so that the load on the second processor is small during normal operation of the monitoring/control installation. The additional procedures for managing the transfer of messages between processors remain confined within the structure of the dynamic messaging mechanisms (existing on the market but modified) and they are not dispersed over the entire set of objects of the first program, so that the invention may be applied to an existing object-oriented program without rewriting its source code.

Other characteristics and advantages of the invention will appear on reading the following description of an embodiment of the invention given with reference to the accompanying drawings.

DESCRIPTION OF THE PREFERRED EMBODIMENTS

Figure 1:
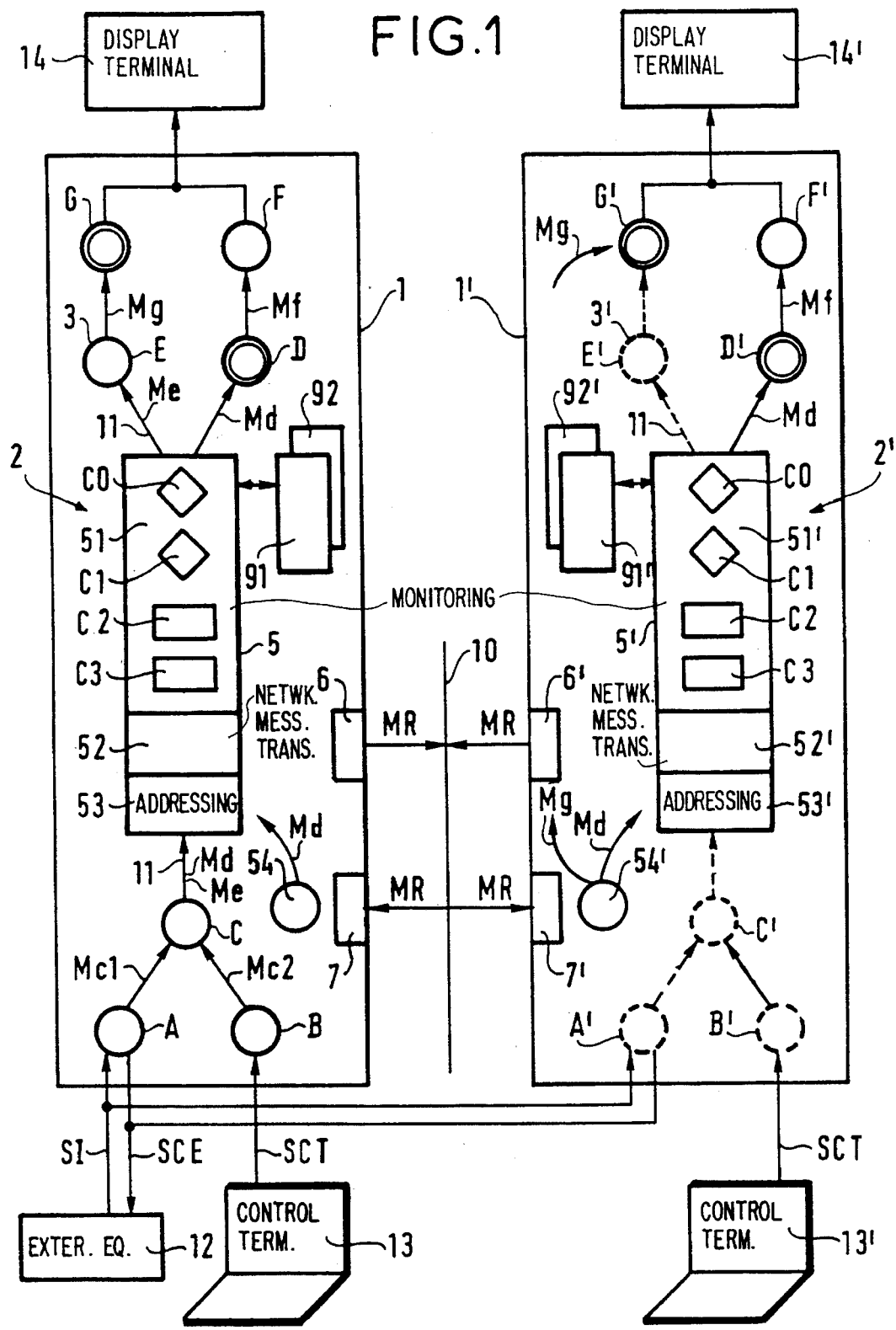
FIG. 1 is a diagram representing a monitoring/control installation of redundant architecture and controlled by an object-oriented software system of the invention.

FIG. 1 shows an object-oriented software system 2 of the invention including a plurality of software objects 3 residing in the memory of a processor 1. The processor 1 is a conventional computer, and it is part of a larger facility constituting a monitoring/control installation of redundant architecture, such as a monitoring/control installation for a control room for controlling industrial equipment. For supervision purposes, the object-oriented software system 2 acquires digital data signals SI coming from external equipment 12, and sends equipment control signals SCE to said equipment, via acquisition software objects such as A. The system also processes such digital data signals SI via other software objects such as C. The system can take account of terminal control signals SCT coming from an operator via man/machine interface software such as B, and via a control terminal 13 implementing such objects. The system manages alarms on the basis of monitoring the result of the processing and via alarm software objects such as E, and displays or signals alarm conditions via first display software objects such as G controlling a display terminal 14. The system also retains the results of processing in archive software objects such as D, and displays variations in the results of processing via second display software objects such as F which also control the display terminal 14.

The processor 1 is connected to another processor 1' via an asynchronous digital communications network 10, said other processor also having a memory containing a replica 2' of the object-oriented software system 2. The communications network may be the Ethernet network. Software system 2' is in turn constituted by software objects 3'. In the figure, the equipment 12 is connected in parallel to processor 1 and to processor 2. Processor 2 is connected to a display terminal 14' and to a control terminal 13'. Objects 3' are replicas of objects 3 and they comprise acquisition software objects such as A', man/machine interface software objects such as B', processing software objects such as C', alarm software objects such as E', archive software objects such as D', and display software objects such as G' and F'.

Objects A, B, C, D, E, F, and G communicate with one another by means of messages in conventional object-oriented programming manner, the messages being of a structure defined by the object-oriented programming language used. Such messages are referred to below as "object messages". The flow of messages between objects follows functional dependency links between the objects, which links are represented by arrows 11.

Each object message M generated by an originating object 3 includes at least one local object identifier identifying a destination object to which such a message is addressed, and a method identifier in the conventional object-oriented programming sense. The object message M may include other parameters, such as data to be taken into account by the method. In accordance with the invention, the message is firstly supplied by an object messaging mechanism 5. The messaging mechanism 5 is part of the software system 2. Conventionally, the purpose of the object messaging mechanism is to establish a link between the local identifier of a method (selector) and the (pointer to the) executable code of the method as a function of the destination object identifier (pointer to the data of the object) included in the object message. Object messaging mechanisms are well known. Such mechanisms include "static" messaging mechanisms which establish the links while the source code of the objects is being compiled, and "dynamic" messaging mechanisms which establish the links at run time. The software structure of such a dynamic messaging mechanism is activated each time a message is sent by an object. Reference is made below to a dynamic object messaging mechanism only. By way of example, the compiler of the programming language "OBJECTIVE-C" sold by Stepstone, or the compiler of the language "SMALLTALK" sold by Xerox, constructs a dynamic messaging mechanism. In order to make it easier to understand the invention, it is recalled that communication between objects by using messages involves an object X being called by an object Y, and object X replying to object Y. An object X being called by an object Y is explicit and can be seen in the syntax of the source code of object Y: in OBJECTIVE-C language, [X name-of-method: arguments] in the source code of object Y denotes that a message is sent by Y to X. The reply from object X to object Y may take place either by means of an explicit call ([Y name-of-method: arguments]), or by means of an implicit call via a function-call stack (reply=[X name-of-method: arguments]). Below, it is assumed that the software objects 3 reply explicitly.

In accordance with a first feature of the invention, a dynamic messaging mechanism is enriched so that, while the software system is being run in the first processor, those messages which are addressed to certain objects 3 in the software system 2 such as the objects encapsulating non-volatile data are discriminated. The message-discrimination function does not affect the source code of the software objects 3. It must be possible for said function to be implemented for each object message M generated by an object 3. In FIG. 1, a messaging mechanism 5 is shown interposed on the object message path 11 and between object C which generates object messages Md, Me, and objects D and E to which the object messages are respectively addressed. Each message is addressed in the addressing section 53 of the messaging mechanism 5. The addressing section 53 is conventional, and it is therefore unnecessary for the section to be described any further.

In accordance with a second feature of the invention, each object 3 has a mark that can be identified by the messaging mechanism 5 using the local identifier of the object. The mark may be an attribute of the object that has a specific value. Said attribute may be inherited from the root of the inheritance hierarchy of the objects 3 via a conventional attribute inheritance mechanism for attributes of object classes. Said attribute is referred to below as the "replication attribute". The initial value of a replication attribute for a specific object is preferably set when the source code of the object is being written, but it can easily be modified when the software system is being configured, or during running thereof, e.g. by said specific object. In accordance with the invention, each of the objects 3 (encapsulating non-volatile data) having a replica 3' that is to be activated in processor 1' has a replication attribute having a specific value which serves as a reference. It is considered that objects D and G in FIG. 1 are designated, by way of example, as replicated objects, i.e. as objects 3 of processor 1 that have replicas 3' that are to be activated in processor 1'.

The messaging mechanism 5 also includes a monitoring section 51 placed upstream from the addressing section 53. Running the code of the monitoring section 51 therefore always precedes running the code of the addressing section 53. The monitoring section 51 is organized to perform the following processing:

in a comparator module C1, comparing the replication attribute of the destination object to which the received message is addressed with the replication reference value, the value of the replication attribute of the object in question being obtained on the basis of the local identifier of the object that is included in the received message;

in a detection module C2, detecting whether the local method identifier included in the received message is present in a first table 91 containing local method identifiers corresponding to global method identifiers, and format descriptors for the method arguments, and, where applicable, supplying a global method identifier which corresponds to the local method identifier present in the first table and the corresponding format descriptor; and in a detection module C3, detecting whether the local identifier of the object that is included in the message is present in a second table 92 containing local object identifiers corresponding to global object identifiers, and, where applicable, supplying a global object identifier which corresponds to the local object identifier present in the second table.

The messaging mechanism 5 further includes a transmission module 52 for forming a network message MR derived from the received object message M, and transmitting the network message via the communications network 10 to processor 1'.

The network message transmission module 52 is organized to construct a network message MR containing the global object identifier and the global method identifier supplied by the detection modules C2 and C3. The transmission module is also organized to construct a network message optionally containing arguments of the method that are encoded using the format descriptor supplied by detection module C2. The transmission module 52 uses a transmission network interface 6 for sending the network message MR over the communications network 10 which broadcasts it to the processors 1 and 1' connected to the network.

It is often simpler, and therefore preferable, to dispose identical object messaging mechanisms 5 and 5' in the two software systems 2 and 2'. Messaging mechanism 5' thus also includes an addressing section 53' a monitoring section 51' including a comparator C1 and detection modules C2, C3 using correspondence tables 91', 92', and a transmission module 52'. Software system 2' also includes a network message reception software module 54' (which is a particular software object) using a reception network interface 7'. Network interface 7' captures the network messages MR sent over the communications network 10, and passes the messages on to the reception module 54'. The reception module 54' is organized to extract a global object identifier, a global method identifier, and optionally a format descriptor from a captured network message MR. By inspecting correspondence tables 91' and 92' that are similar to tables 91 and 92, the reception module recovers a local object identifier, a local method identifier and optionally the arguments of the method via the format descriptor. The reception module then forms an object message M' and addresses it to the destination object replica 3' via object messaging mechanism 5'. It is to be understood that the local object identifiers and local method identifiers in tables 91' and 92' are specific to processor 1', and those in tables 91 and 92 are specific to processor 1. Tables 91, 92, 91', and 92' may be constructed on compilation, after compilation, or on initialization of software systems 2 and 2'.

It is generally desirable to guarantee that the objects 3 and their replicas 3' in the two processors 1 and 1' receive the same messages in the same order (causal and full ordering condition) regardless of the activity of the two software systems 2 and 2'. The object messages captured by messaging mechanism 5 and sent to processor 1' in the form of network messages are not consecutively addressed to the destination objects 3 to which the messages are addressed, but pass firstly via the communications network 10 and are then time-delayed at the input of each processor 1 and 1' by means of an ordered and atomic broadcast protocol. To this end, software system 2 also includes a network message reception software module 54 using a reception network interface 7. The network interface 7 captures the network messages MR sent over the communications network 10 and passes them on to the reception module 54. The reception module 54 is organized to extract a global object identifier, a global method identifier, and optionally a format descriptor from a captured network message MR. By inspecting correspondence tables 91 and 92, the reception module recovers a local object identifier, a local method identifier and optionally the arguments of the method via the format descriptor. The reception module then forms an object message M and addresses it via the object messaging mechanism 5 to the destination object 3 identified by the local object identifier. The ordered and atomic broadcast protocol can then be implemented in the source code of the network message transmission module 52 and the network message reception modules 54, 54' by using the "ABCAST" (or "CBCAST") functions of the ISIS system sold by Isis Distributed Systems. So as to avoid looping inside the messaging mechanism 5 when an object message M supplied by the reception module 54 is being returned, the monitoring section 51 of the messaging mechanism 5 is organized to compare, in a comparator C0 placed upstream from comparator C1, whether a flag (a Boolean variable) is equal to or different from a broadcast inhibition reference value. Below, it is considered that the flag is set if its value is equal to the inhibition reference value, and cleared if such is not the case.

Figure 2:
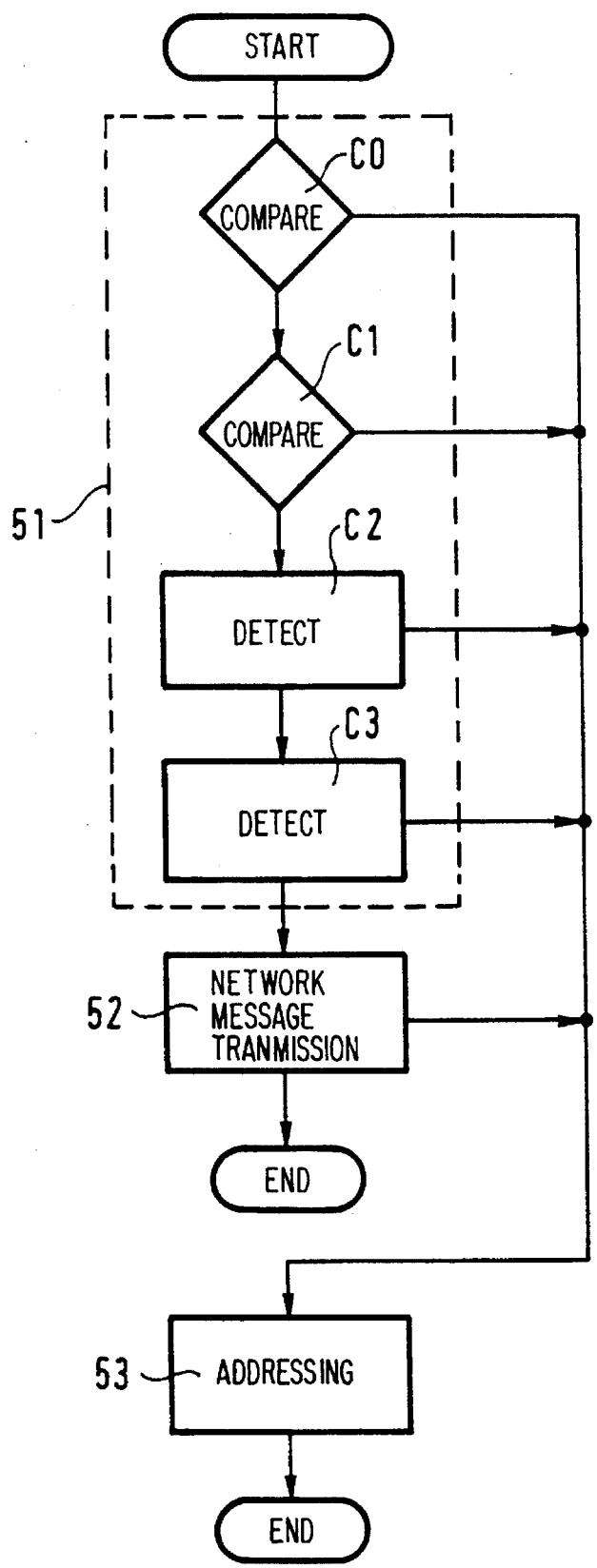
FIG. 2 is a flow chart showing how the control means for the object messaging mechanism of the invention operates.

With reference to FIG. 2, the messaging mechanism 5, and more particularly the monitoring section 51 thereof, operates as follows. At the input of the messaging mechanism 5, the flag is tested in the comparator C0. If the flag is cleared, processing continues in the addressing section 53. If the flag is set, the replication attribute of the destination object to which the message is addressed is tested in the comparator C1. If the value of the replication attribute of the object is different from the replication reference value, processing continues in the addressing section 53. If such is not the case, processing continues in detection module C2. The detection module scans table 91 to detect whether the local method identifier is present therein. If it is present, a global method identifier is extracted from table 91, a format descriptor is optionally extracted therefrom, and processing continues in detection module C3. Table 91 may contain modifying method identifiers only. A modifying method is a method that modifies the data of the object to which it is applied. By discriminating messages on modifying methods, it is possible to reduce the useful flow of network messages over the communications network 10. Should the local method identifier not be present in table 91, processing continues in the addressing section 53. Detection module C3 scans table 92 to detect whether the local object identifier is present therein. If it is present, a global object identifier is extracted from table 92, and processing continues in the transmission module 52 which forms the network message MR. The messaging mechanism 5 therefore includes two outputs, namely the addressing section 53 and the network message transmission module 52.

The flag is normally set on initialization of the software system 2, but it is cleared by the network message reception module 54 when said reception module calls the messaging mechanism 5 to send an object message derived from the received network message to an object. This avoids looping back in the monitoring section 51. The flag is also set by the network message reception module 54 so that the messaging mechanism can, once again, discriminate the object messages to be taken into account. Naturally, all the characteristics of messaging mechanism 5 are also to be found in messaging mechanism 5'. The same applies for the network message reception modules 54 and 54'.

The overall operation of software system 2 and of software system 2' is described below, in the case of message interchange between object C and object D which has a replication attribute value that is equal to the replication reference value.

Object C generates a message Md including an object identifier identifying object D, and a method identifier identifying a modifying method. Messaging mechanism 5 is implemented. Processing continues successively in comparators C0 and C1, then in detection modules C2, C3, and finally in network message transmission module 53. A network message MR is sent over the communications network 10 via the transmission interface 6.

In response to the network message MR being received and taken into account, the network message reception interfaces 7 and 7' pass on the network message MR respectively to network message reception module 54 and to network message reception module 54' by using the ordered and atomic broadcast protocol. The network message reception modules 54, 54' clear the flags of the messaging mechanisms 5, 5'. Each of the reception modules then sends an object message Md to its respective messaging mechanism. The monitoring section 51 of messaging mechanism 5 is implemented again for the message Md. Processing then continues in comparator C0, and then in the addressing section 53 because the flag is cleared. The addressing section 53 addresses the message Md to object D. In the same way, in monitoring section 51', processing continues in comparator C0, and then in addressing section 53', because the flag is cleared.

In response to message Md, object D in turn uses messaging mechanism 5 to send a message Mf including an object identifier identifying object F, and a method identifier. Since the flag is still cleared, processing in the messaging mechanism 5 continues firstly in comparator C0, and then in addressing section 53 (regardless of whether object F is declared replicated). Identical processing is performed by messaging mechanism 5' for objects D' and F'. The flags are set in the network message reception modules 54 and 54' when the code of the respective messaging mechanism 5 or 5' is run in full for the call by the respective object D or D'. The flag is normally set after message Mf has been sent by object D to object F. For message Me generated by object C and addressed to object E, the monitoring section 51 of messaging mechanism 5 is implemented again. Processing continues in comparators C0, C1, and in addressing section 53 because object E is not a replicated object.

In response to message Me being taken into account, object E generates message Mg which is addressed to a replicated object G. Once again, in messaging mechanism 5, processing continues in comparators C0 and C1, in detection modules C2 and C3, and in network message transmission module 52. A new network message MR is sent over the communications network 10.

In the replica 2' of the software system 2, only replicas D', F' and G' of objects D, F, and G are normally activated by the messaging mechanism 5', thereby limiting the processing load of processor 1'. However, objects B', C', E' can be activated via control terminal 13' which acts on object B'. Advantageously, the messaging mechanism 5' of the replica 2' of the software system 2 then also includes a network message transmission module 52' using a network transmission interface 6'. In which case, the network messages are broadcast over the communications network 10 from the network message transmission module 52'.

There may be situations in which the order of the object messages received by an object 3 differs from the order of the object messages received by a replica 3' of said object 3. When object D receives object message Md from object C and an object message Md' from object B, and if object C is declared replicated, it is possible that the order in which messages Md and Md' are taken into account by messaging mechanism 5 differs from the order in which the same messages are taken into account by messaging mechanism 5', because the flag inhibits use of ordered and atomic broadcasting when message Md is being sent from object C to object D. This may cause message inversion on objects D and D' if processing can be pre-empted. To solve this problem, a command may be provided in each network message reception module 54 to prevent the programmer from pre-empting any object processing during processing of the object sequence C-D-F (commonly referred to as the "thread"). To this end, each network message reception module is organized to inhibit the computer before the call is made to the messaging mechanism, and to remove the inhibition after the call. It should be noted that complex interaction between objects may result in objects being declared as being replicated even though they do not contain non-volatile data, so as to simplify the flow of traffic over the communications network, and so as to avoid the problems of message sequencing between replicated objects.

The object-oriented software system of the invention makes it possible to control an installation of redundant architecture using a semi-active redundancy technique without having to call into question the structure of the software objects. Therefore, the invention may be applied easily to existing object-oriented software systems. In this way, for an existing object-oriented software system based on the "OBJECTIVE-C" language, a few instructions in OBJECTIVE-C source code need merely be included in the code of the dynamic messaging mechanism produced by the OBJECTIVE-C compiler for it to be possible to make the monitoring section 51, the network message transmission module 52, and the network message reception module 54 by using the primitives of the ISIS system. Naturally, the invention may be applied to an installation having a redundant structure and comprising more than two processors, each processor having a messaging mechanism, a network message transmission module, and a network message reception module.

Naturally, the invention is not limited to the above-described embodiment, and other variants may be provided without going beyond the ambit of the invention.

We claim:

1. In a monitoring/control installation comprising: a first processor (1) acting as a primary processor for running a first object-oriented program (2) having first objects (A,B,C,D, E,F,G) and a first dynamic object messaging mechanism (5), and a second processor (1') connected to said first processor via a communication network (10), said second processor acting as a backup processor for running a second object-oriented program (2') having second objects (A',B',C',D',E', F',G') and a second dynamic object messaging mechanism (5') with said second objects being replicas of at least certain ones (D,G) of said first objects which encapsulate non-volatile data, a method for maintaining consistency between said certain ones of said first objects in said first processor and said second objects in said second processor during runtime of said first program, said method comprising the steps of:

providing a mark to each of said first objects, said mark being retrievable from processing of an operation invocation on said first objects via said first dynamic object messaging mechanism;

setting the mark of said certain ones of said first objects with a specific value;

in said first dynamic object messaging mechanism, detecting (51,C1), from each operation invocation on one of said a first objects, whether said one of said first objects has a mark set with said specific value, when said one of said first objects has a mark not set with said specific value, performing (53) the processing of said operation invocation on said one of said first objects, when said one of said first objects has a mark set with said specific value, broadcasting (52) an object call message corresponding to said operation invocation on said one of said first objects via said communication network for time delaying said object call message at an input of said first processor and said second processor by using an atomic and ordered broadcast protocol, and retrieving (54), from said communication network, object call messages and processing said object call messages to perform a succession of corresponding operation invocations on said first objects; and in the second dynamic object messaging mechanism, retrieving (54'), from said communication network, object call messages, and processing said object call messages to perform a succession of corresponding operation invocations on said second objects, so that the successive operations on said certain ones of said first objects in said first processor and the successive operations on the replicas of said certain ones of said first objects in said second processor are performed in the same order.

2. The method according to claim 1, further comprising, in said first dynamic object messaging mechanism, the steps of:

detecting (51,C0), from each operation invocation on one of said a first objects, whether said operation has an operation identifier which is present in a table of operation identifiers, and processing (53) said operation invocation without broadcasting an object call message via said communication network when said operation identifier is not present in said table of operation identifiers even if said first object has a mark set with said specific value 3. The method according to claim 1, wherein the step providing a mark to each of said first objects is performed by inheritance of an additional attribute of an object class defining objects of said first program.

4. The method according to claim 2, wherein the step providing a mark to each of said first objects is performed by inheritance of an additional attribute of an object class defining objects of said first program.

\* \* \* \* \*